United States Patent
Simon

(10) Patent No.: US 8,099,980 B2
(45) Date of Patent: Jan. 24, 2012

(54) I.S. MACHINE

(75) Inventor: Jonathan S. Simon, Pleasant Valley, CT (US)

(73) Assignee: Emhart Glass S.A., Cham (CH)

( * ) Notice: Subject to any disclaimer, the term of this patent is extended or adjusted under 35 U.S.C. 154(b) by 0 days.

(21) Appl. No.: 13/154,002

(22) Filed: Jun. 6, 2011

(65) Prior Publication Data
US 2011/0232331 A1    Sep. 29, 2011

Related U.S. Application Data

(62) Division of application No. 11/445,894, filed on Jun. 2, 2006, now Pat. No. 7,975,510.

(51) Int. Cl.
*C03B 9/20* (2006.01)
*C03B 9/30* (2006.01)
*C03B 9/38* (2006.01)

(52) U.S. Cl. .......................................... 65/63; 65/110

(58) Field of Classification Search .............. 65/63, 110, 65/230, 244, 267
See application file for complete search history.

(56) References Cited

U.S. PATENT DOCUMENTS

| | | | |
|---|---|---|---|
| 1,976,239 A | 10/1934 | Lorenz et al. |
| 2,161,255 A | 6/1939 | Howard |
| 2,744,358 A | 5/1956 | Rowe |
| 4,599,099 A | 7/1986 | Jones |
| 4,983,203 A | 1/1991 | Erb et al. |
| 5,824,131 A | 10/1998 | Grant et al. |

*Primary Examiner* — Matthew Daniels
*Assistant Examiner* — Cynthia Szewczyk
(74) *Attorney, Agent, or Firm* — Reinhart Boerner Van Deuren S.C.

(57) ABSTRACT

An I.S. Machine is provided wherein the blow molds are closed to a slightly cracked location whereby applied cooling air can not leak into and pressurize the blow mold thereby damaging the parison during reheat. When reheat is completed, the blow molds are fully closed and the parison is transformed into a bottle by applying compressed air and/or vacuum.

16 Claims, 4 Drawing Sheets

I.S. MACHINE

CROSS REFERENCE TO RELATED APPLICATIONS

This patent application is a divisional patent application of U.S. patent application Ser. No. 11/445,894, now U.S. Pat. No. 7,975,510, filed on Jun. 2, 2006 and issued Jul. 12, 2011, entitled "I.S. Machine," which patent application is assigned to the assignee of the present invention and which is hereby incorporated herein by reference in its entirety.

BACKGROUND OF THE INVENTION

Field of the Invention

The present invention relates generally to I.S. Machines for forming glass bottles from gobs of molten glass, and more particularly to a method for operating the opposed side molds of a blow mold to maintain the opposed side molds in a cracked position while the parison reheats in the blow mold.

In an I.S. Machine, a gob of molten glass is delivered to a blank mold in which a "parison" is formed. The formed parison includes the "finish," i.e., the threads, etc. of the bottle to be formed which are at the bottom of the vertically standing parison. The parison also has an elongated vertical hole which extends upwardly from the finish. The finish is gripped by neck ring molds carried by a pair of closed neck rings. When the blank mold is opened, the neck ring is rotated 180 degrees to deliver the parison to the blow station where opposed blow molds will be displaced into a clamped closed position about the parison. The finish, and hence the parison, is supported by the closed blow molds. Reheat then takes place, i.e., the skin of the parison which had been cooled to preserve the shape of the parison, is heated by the inner heat of the parison. When this happens the parison will sag or stretch downwardly by virtue of the parison being suspended from the molds. When the parison stretches to the desired length, either compressed air is introduced into the mold via a blow head sitting on top of the blow molds and/or vacuum is applied through the walls of the blow mold to displace the parison into the form of the mold.

Often cooling air is directed upwardly through the side walls of the blow molds to remove heat from the molds. It has been suggested that such air tends to leak into the blow mold and heated by the parison creates a large pressure that tends to collapse the parison so that instead of a continuous hole the hole is closed at some central location bringing one side of the parison into engagement with the other side of the parison. Should this happen, a "birdswing" can form when the parison is blown which is a defect requiring the rejection of the ultimately formed bottle.

To avoid birdswings, operators conventionally delay the start of cooling air until the parison has been blown but this slows down the cycle time and this is undesirable.

SUMMARY OF THE INVENTION

The disadvantages and limitations of the background art discussed above are overcome by the present invention, which provides a better solution for this problem.

In one aspect of the present invention, a method for operating the blow mold of a blow station of an I.S. machine to transform a parison having a formed finish into a container within the blow mold is provided wherein the blow mold includes a pair of opposed side molds that are movable towards and away from each other, the method comprising: determining when a parison is located at the blow station; when it has been determined that a parison is located at the blow station, displacing the side molds from a remote location to a cracked position around the parison whereat a selected separation exists between the side molds; said selected separation being selected so that a parison, when located within the blow mold with the side molds located at the cracked position, will support the finish of the parison while the parison reheats; and displacing the side molds to a closed position at the completion of the parison reheating and blowing the parison into a container in the closed blow mold.

In another aspect of the present invention, a method for improving the quality of a container including a finish formed in an I.S. Machine, the I.S. machine including a pair of side molds that are movable towards and away from each other and a bottom plate, is provided wherein the side molds and the bottom plate collectively define an interior volume, the I.S. machine also including a cooling system configured to provide pressurized cooling air into the side molds, the method comprising: displacing the side molds from a remote location to a cracked position around a parison located at the blow station whereat a selected separation exists between the side molds and the side molds support the finish of the parison while the parison reheats; displacing the side molds to a closed position at the completion of the parison reheating and blowing the parison into a container in the closed blow mold; moving the side molds away from each other after the container is formed in the mold interior volume; and stopping the movement of the side molds at a preselected separation permitting the pressurized cooling air to escape the mold interior volume, wherein the cooling air does not cause the container to deform.

In yet another aspect of the present invention, a method for operating a blow mold of a blow station of an I.S. machine to transform a parison having a formed finish into a container within the blow mold is provided wherein the blow mold includes a pair of opposed side molds that are movable towards and away from each other by an open and close mechanism that displaces the side molds from a remote location to a closed position, the method comprising: determining when a parison is located at the blow station; when it has been determined that a parison is located at the blow station, operating the open and close mechanism to displace the side molds from the remote location to a cracked position around the parison whereat a selected separation exists therebetween, wherein when a parison is located within the blow mold with the side molds located at the cracked position, the side molds will support the finish of the parison while the parison reheats; maintaining the side molds at the cracked position during reheating of the parison; and subsequently operating the open and close mechanism to displace the side molds to the closed position at the conclusion of parison reheating and then blowing the parison into a container in the closed blow mold.

Other objects and advantages of the present invention will become apparent from the following portion of this specification and from the accompanying drawings which illustrate, in accordance with the mandate of the patent statutes, a presently preferred embodiment incorporating the principles of the invention.

DESCRIPTION OF THE DRAWINGS

These and other advantages of the present invention are best understood with reference to the drawings, in which.

DETAILED DESCRIPTION OF THE PREFERRED EMBODIMENT

Figure 1:
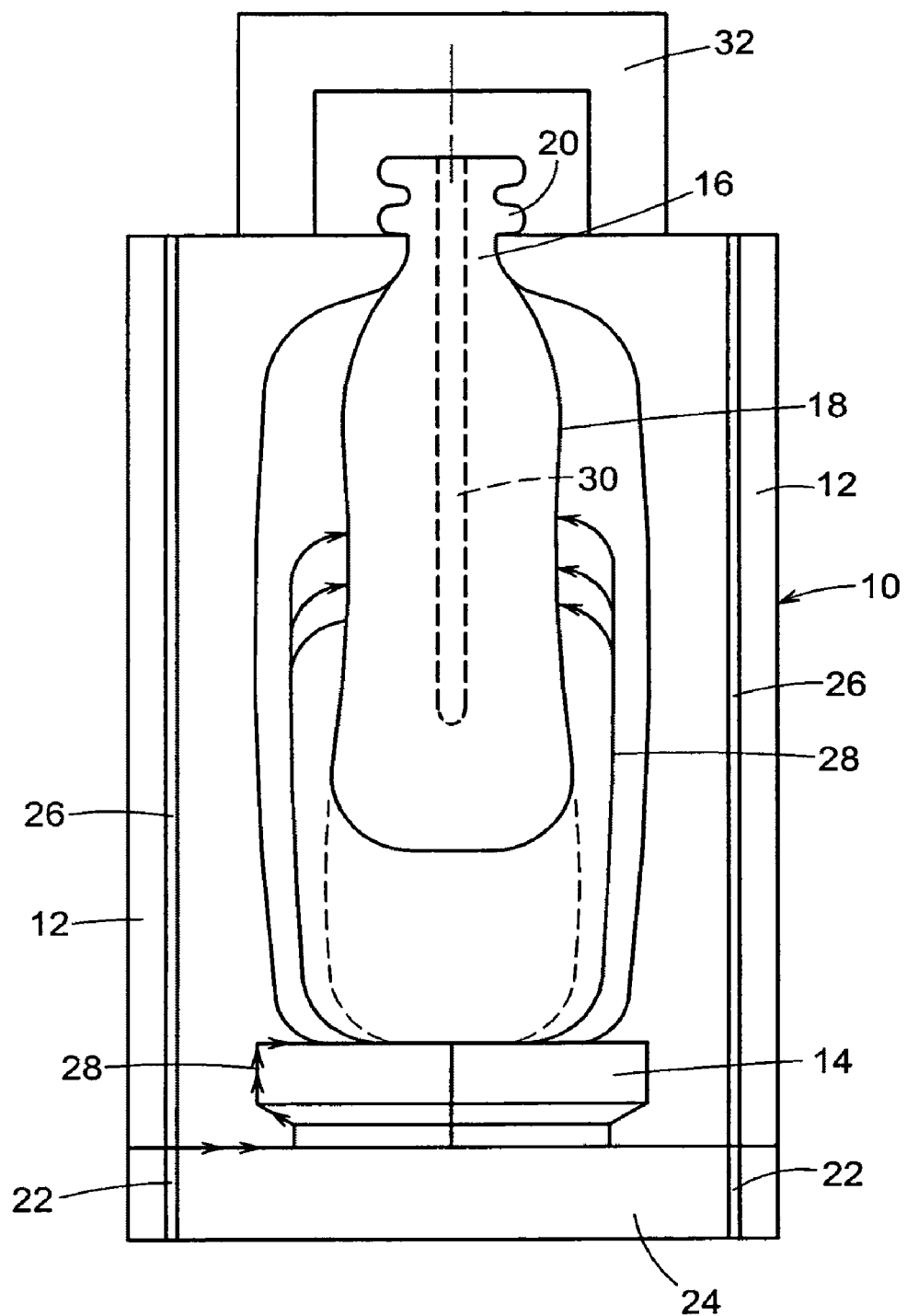
FIG. 1 is a side elevational view of a conventional blow mold of an I.S. Machine closed about a parison.

Each section of an I. S. Machine forms one or more gobs of molten glass into a bottle. For each gob there will be a blank mold for forming a gob into a parison and a blow mold for forming the parison into a bottle. A blow mold 10 is shown in FIG. 1 which is made up of an opposed pair of side molds 12 and a bottom plate 14 which interfits with the side molds when the side molds are fully closed as shown. As shown, the fully closed blow mold sides grip the neck 16 of a parison 18. The finish 20 of the parison was held by the neck rings of an invert mechanism until the parison became supported by the blow mold. The neck rings then opened and were displaced back to the blank molds.

The parison, which has a long hole 30 extending downwardly from the top, will reheat, i.e., the chilled skin will be heated by the internal heat of the parison, and once reheated the parison will begin to stretch downwardly. When the parison stretches down to the bottom plate as shown in dotted lines, the parison will be transformed into a bottle either by applying vacuum to the inside surface of the mold or by applying air pressure via a blowhead 32 located on top of the blow mold.

Cooling air is supplied to vertical holes 22 in the base 24 for the bottom plate 14 and these holes communicate with cooling holes 26 extending vertically through the blow mold sides 12. When a source of pressurized air is turned on cooling air will be forced through these cooling holes to remove heat from the blow mold sides. It is believed that this cooling air bleeds between the bottom surface of the blow mold and the top surface of the base and works its way between the bottom plate and the side molds into the interior of the blow mold and that this leakage expands due to the heat of the parison and acts to crush the parison ultimately causing a birdswing in the formed bottle. These pressure forces are illustrated with arrows 28.

Figure 2:
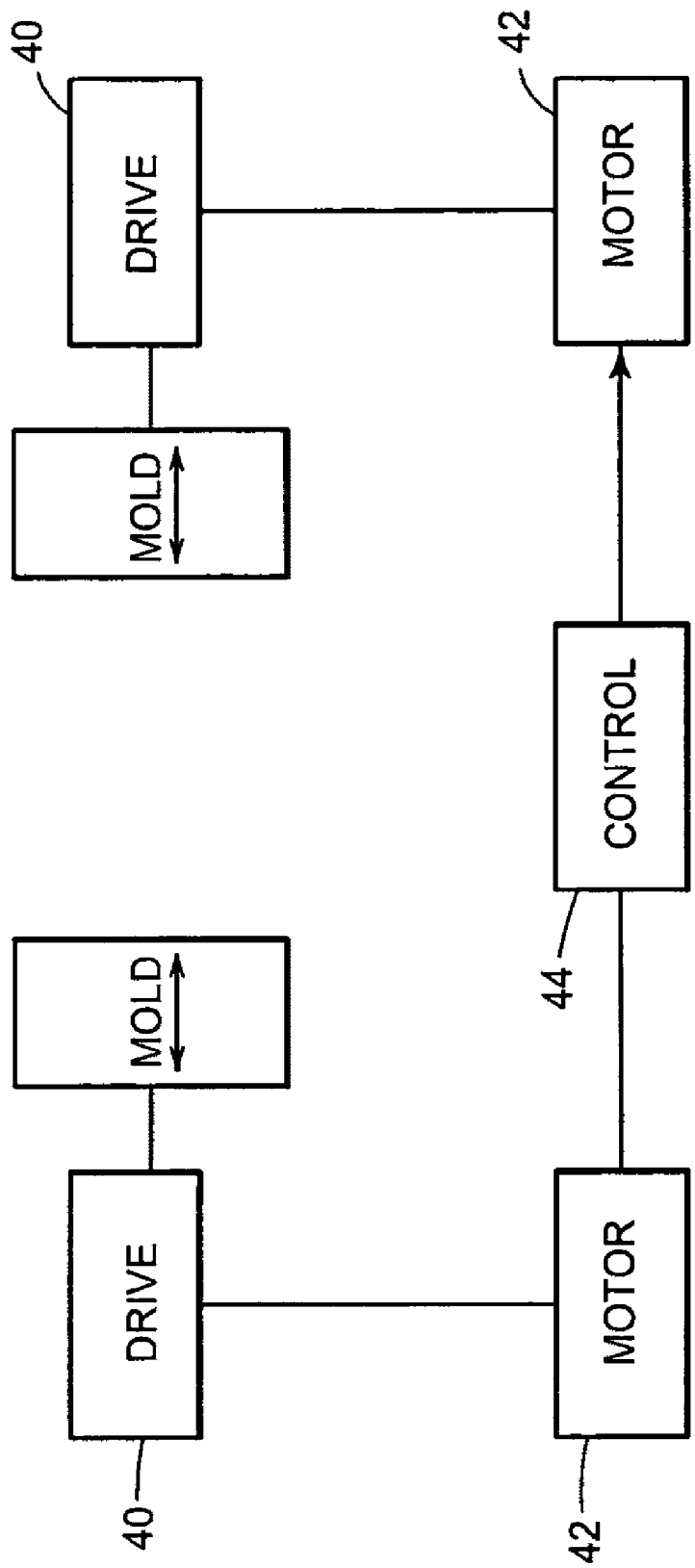
FIG. 2 is a schematic showing a conventional blow mold open and close mechanism.

A conventional blow mold open and close mechanism is shown in FIG. 2 where a pair of opposed side molds 12 are supported for displacement toward and away from each other. Displacement is via a drive 40 powered by a motor 42. Motion is controlled by a suitable control 44.

Figure 3:
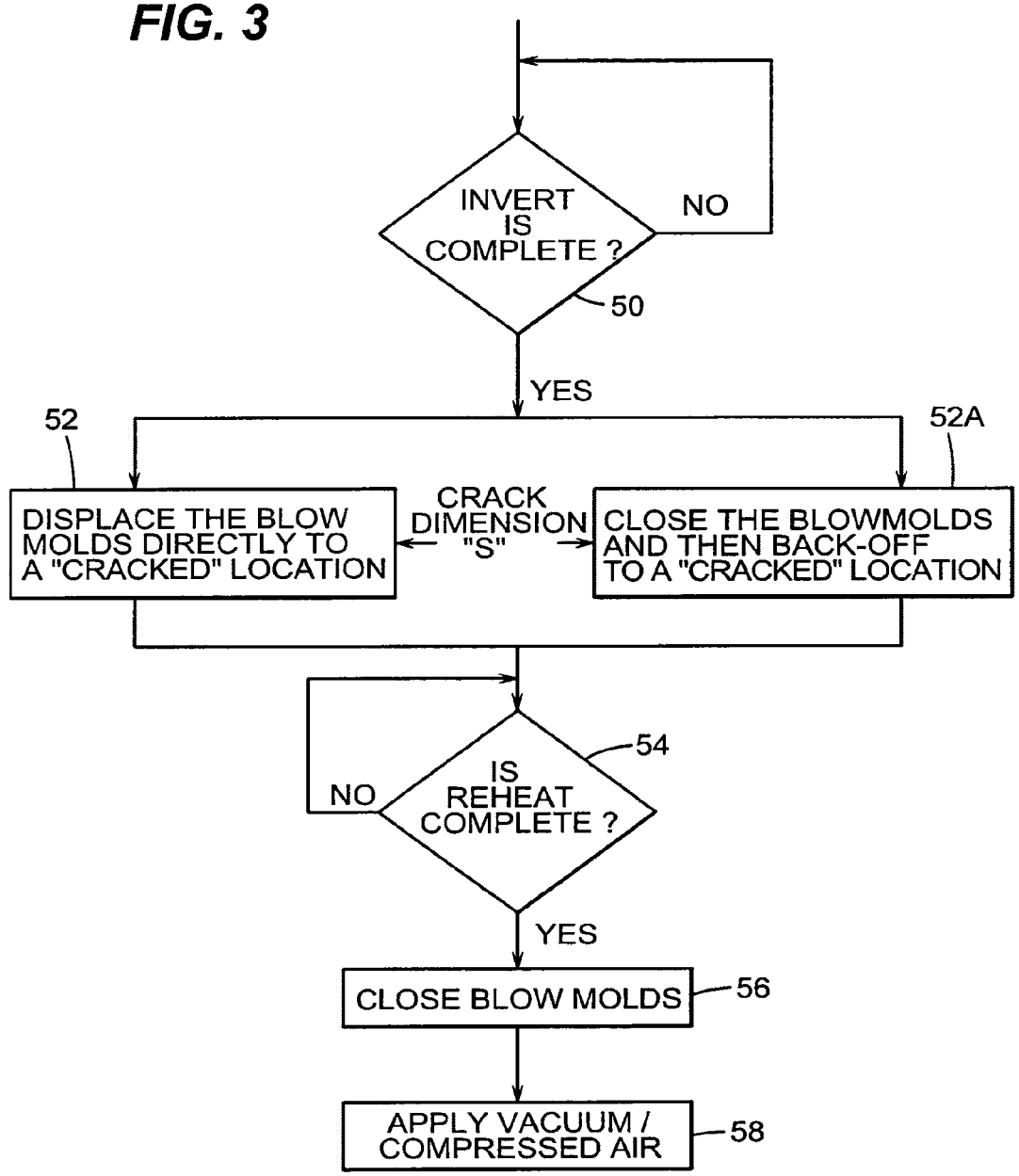
FIG. 3 is a logic diagram illustrating the operation of the control for the blow mold open and close mechanism.
Figure 4:
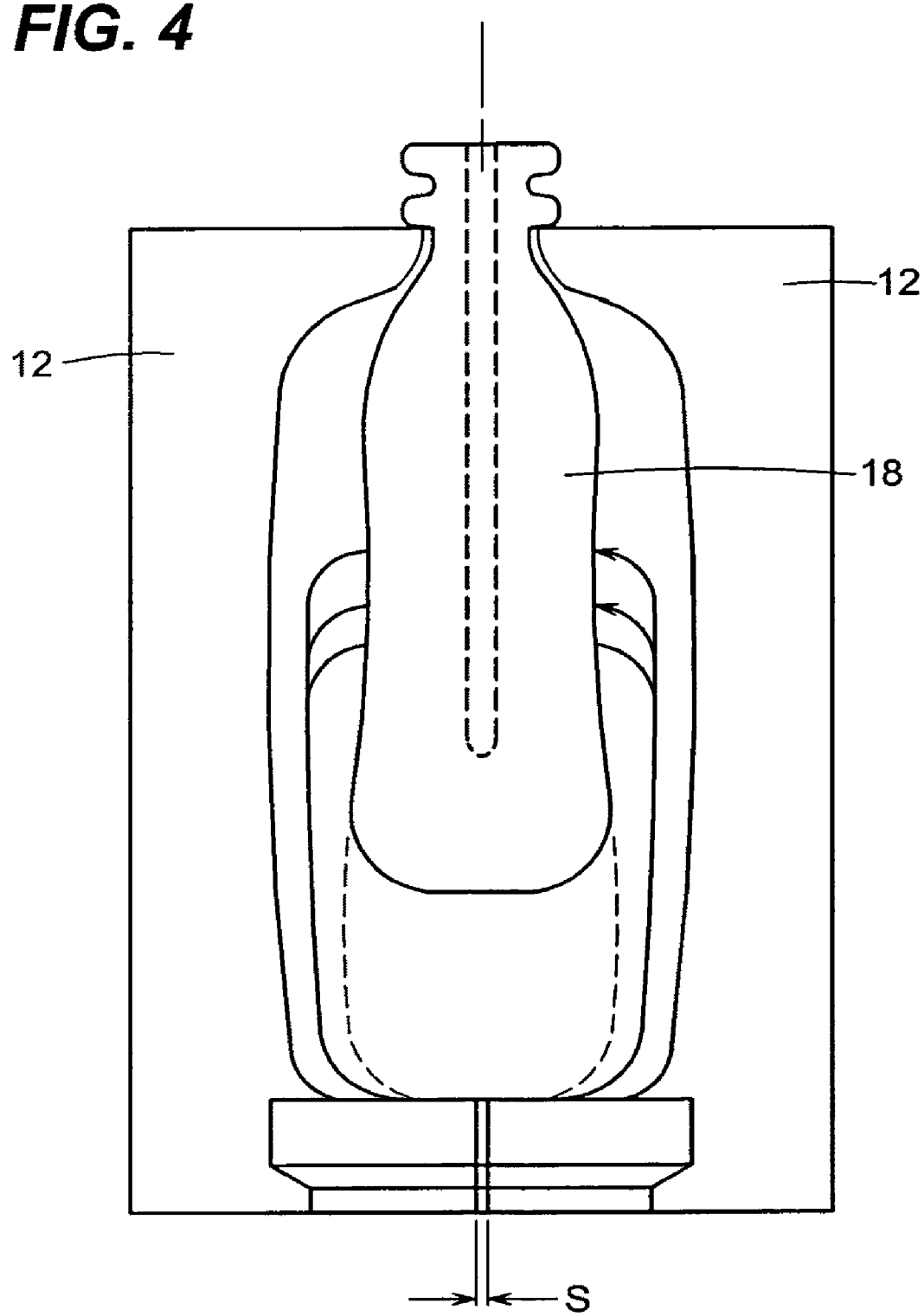
FIG. 4 is a view similar to that of FIG. 1 with the blow molds cracked during reheat.

In accordance with the invention, when "Invert Is Complete?" 50 (This will be a time observed by an operator who is defining the event angles around a 360 degree timing drum—at this time the operator will see that the parison is located at the blow station and that the blow molds can be closed), the Control 44 will Displace The Blow Molds Directly To A Cracked Location 52. FIG. 3 shows this cracked location where "S" represents the crack or separation between the blow molds. This separation, which can be set by the operator, will be limited so that the top of the molds will continue to support the finish of the bottle. This could be a one step feed process to the cracked location or the control can Close The Blow Molds And Than Back-off To A "Cracked" location 52A. The crack only has to be wide enough to prevent the pressurization of the mold between the parison and the inner mold surface.

When the query "Is Reheat Complete" 54 is answered yes (which can be an automated function or determined by the operator), which means that it is time for the parison to be formed into a bottle, the Control 44 will Close Blow Molds 56 and then Apply Vacuum/Compressed Air 58 to transform the parison into a bottle in the blow molds.

Although the foregoing description of the present invention has been shown and described with reference to particular embodiments and applications thereof, it has been presented for purposes of illustration and description and is not intended to be exhaustive or to limit the invention to the particular embodiments and applications disclosed. It will be apparent to those having ordinary skill in the art that a number of changes, modifications, variations, or alterations to the invention as described herein may be made, none of which depart from the spirit or scope of the present invention. The particular embodiments and applications were chosen and described to provide the best illustration of the principles of the invention and its practical application to thereby enable one of ordinary skill in the art to utilize the invention in various embodiments and with various modifications as are suited to the particular use contemplated. All such changes, modifications, variations, and alterations should therefore be seen as being within the scope of the present invention as determined by the appended claims when interpreted in accordance with the breadth to which they are fairly, legally, and equitably entitled.

What is claimed is:

1. A method for operating the blow mold of a blow station of an I.S. machine to transform a parison having a formed finish into a container within the blow mold wherein the blow mold includes a pair of opposed side molds that are movable towards and away from each other, the method comprising:
    determining when a parison is located at the blow station;
    when it has been determined that a parison is located at the blow station, displacing the side molds from a remote location to a cracked position around the parison whereat a selected separation exists between the side molds;
    said selected separation being selected so that a parison, when located within the blow mold with the side molds located at the cracked position, will be supported by the side molds while the parison reheats; and
    displacing the side molds to a closed position at the completion of the parison reheating and blowing the parison into a container in the closed blow mold.

2. A method as defined in claim 1, wherein the side molds are displaced to the cracked position by first displacing the side molds from the remote location to the closed position and then displacing the side molds to the cracked position.

3. A method as defined in claim 1, wherein the side molds are displaced to the cracked position by directly displacing the side molds from the remote location to the cracked position without first displacing the side molds to the closed position.

4. A method as defined in claim 1, wherein the selected separation is sufficiently wide to prevent the pressurization of the blow mold between the parison and inner surfaces of the blow mold.

5. A method as defined in claim 1, wherein the selected separation is adjustable by an operator.

6. A method for improving the quality of a container including a finish formed in an I.S. Machine, the I.S. machine including a pair of side molds that are movable towards and away from each other and a bottom plate, wherein the side molds and the bottom plate collectively define an interior volume, the I.S. machine also including a cooling system configured to provide pressurized cooling air into the side molds, the method comprising:

displacing the side molds from a remote location to a cracked position around a parison located at the blow station whereat a selected separation exists between the side molds and the side molds support the finish of the parison while the parison reheats;

displacing the side molds to a closed position at the completion of the parison reheating and blowing the parison into a container in the closed blow mold;

moving the side molds away from each other after the container is formed in the mold interior volume; and stopping the movement of the side molds at a preselected separation permitting the pressurized cooling air to escape the mold interior volume, wherein the cooling air does not cause the container to deform.

7. A method as defined in claim 6, wherein the side molds are displaced to the cracked position by first displacing the side molds from the remote location to the closed position and then displacing the side molds to the cracked position.

8. A method as defined in claim 6, wherein the side molds are displaced to the cracked position by directly displacing the side molds from the remote location to the cracked position without first displacing the side molds to the closed position.

9. A method as defined in claim 6, wherein a drive motor, coupled to each of the side molds, is configured to move each side mold.

10. A method as defined in claim 6, wherein the preselected separation is adjustable by an operator.

11. A method as defined in claim 6, wherein the container is a glass bottle.

12. A method for operating a blow mold of a blow station of an I.S. machine to transform a parison having a formed finish into a container within the blow mold wherein the blow mold includes a pair of opposed side molds that are movable towards and away from each other by an open and close mechanism that displaces the side molds from a remote location to a closed position, the method comprising:

determining when a parison is located at the blow station;

when it has been determined that a parison is located at the blow station, operating the open and close mechanism to displace the side molds from the remote location to a cracked position around the parison whereat a selected separation exists therebetween, wherein when a parison is located within the blow mold with the side molds located at the cracked position, the side molds will support the finish of the parison while the parison reheats;

maintaining the side molds at the cracked position during reheating of the parison; and subsequently operating the open and close mechanism to displace the side molds to the closed position at the conclusion of parison reheating and then blowing the parison into a container in the closed blow mold.

13. A method as defined in claim 12, wherein the open and close mechanism is operated to displace the side molds to the cracked position by first operating the open and close mechanism to displace the side molds to the closed position and then operating the open and close mechanism to displace the side molds to the cracked position.

14. A method as defined in claim 12, wherein the open and close mechanism is operated to displace the side molds to the cracked position by operating the open and close mechanism to displace the side molds directly to the cracked position without first operating the open and close mechanism to displace the side molds to the closed position.

15. A method as defined in claim 12, wherein the separation is sufficiently wide to prevent the pressurization of the blow mold between the parison and inner surfaces of the blow mold.

16. An I.S. Machine according to claim 12, wherein the separation is adjustable by an operator.

* * * * *